United States Patent
Bruhmann et al.

[11] Patent Number: 6,143,404
[45] Date of Patent: Nov. 7, 2000

[54] LINING FOR A DRIVING OR RETURN DRUM OF A CONVEYOR BELT

[75] Inventors: Wolfgang Friedrich Wilhelm Bruhmann, Leichlingen, Germany; Emmanuel Davidts, Ecaussinnes, Belgium

[73] Assignees: Technic Gum, Soignies, Belgium; M.I.C.K.E. Brühmann GmbH & Co. KG, Duisburg, Germany

[21] Appl. No.: 08/996,277

[22] Filed: Dec. 22, 1997

[30] Foreign Application Priority Data

Dec. 20, 1996 [EP] European Pat. Off. .............. 96870160

[51] Int. Cl.⁷ ....................................................... B32B 5/16
[52] U.S. Cl. ........................... 428/325; 198/835; 428/331; 428/407; 428/425.9
[58] Field of Search ..................................... 428/325, 331, 428/407, 492, 425.9; 198/835

[56] References Cited

U.S. PATENT DOCUMENTS

| | | |
|---|---|---|
| 1,330,988 | 2/1920 | Sayre . |
| 2,867,125 | 1/1959 | Glover . |
| 3,607,606 | 9/1971 | Beninga ................................. 161/162 |
| 4,162,900 | 7/1979 | Judd ........................................... 51/295 |
| 4,290,761 | 9/1981 | Suginaka ................................. 474/190 |
| 4,476,256 | 10/1984 | Hamermesh ........................... 523/152 |
| 4,761,317 | 8/1988 | Ebata et al. .............................. 428/67 |
| 4,848,681 | 7/1989 | Eriksson et al. ....................... 241/193 |
| 4,855,174 | 8/1989 | Kawamoto ................................ 428/67 |
| 5,502,109 | 3/1996 | Wallenwein et al. .................... 525/141 |
| 5,595,266 | 1/1997 | Cecere .................................. 188/251 A |

FOREIGN PATENT DOCUMENTS

| | | |
|---|---|---|
| 0239660 | 10/1987 | European Pat. Off. . |
| 2231693 | 12/1974 | France . |
| 2298732 | 8/1976 | France . |
| 2930186 | 7/1980 | Germany . |

OTHER PUBLICATIONS

Patent Abstracts of Japan, vol. 012, No. 018, M–160, Jan. 20, 1988 & JP 62 177359.
Database WPI, Section Ch, Week 8636, Derwent Pub. Class A83, AN 86–236293 & JP 61 1666710A, 1986.

*Primary Examiner*—H. Thi Le
*Attorney, Agent, or Firm*—Dykema Gossett PLLC

[57] ABSTRACT

A lining for a driving or return drum of a conveyor belt includes an elastic material based on natural or synthetic rubber or a polyurethane containing ceramic particles whose dimensions lie between about 10 and about 2000 microns.

7 Claims, 1 Drawing Sheet

LINING FOR A DRIVING OR RETURN DRUM OF A CONVEYOR BELT

BACKGROUND OF THE INVENTION

The present invention relates to a lining for a driving or return drum of a conveyor belt.

The aim of the invention is to produce a lining whose resistance to wear and whose coefficient of friction are considerably greater then those already existing by using reliable and easily controllable techniques.

SUMMARY OF THE INVENTION

In order to achieve this aim in conformity with the invention, the lining for driving drums and return pulleys consists of an elastic material based on natural or synthetic rubber or on a polyurethane or its technical equivalent, incorporated in which are ceramic particles whose dimensions lie between about 10 and about 2000 microns.

Astonishing results have been obtained by making use of particles coated in an epoxy binder.

Other details and advantages of the invention will emerge from the description given below of a lining for a driving or return drum according to the invention. This description is given only as an example and does not limit the invention. The reference numbers refer to the attached drawings.

DETAILED DESCRIPTION OF THE PREFERRED EMBODIMENT

Figure 1:
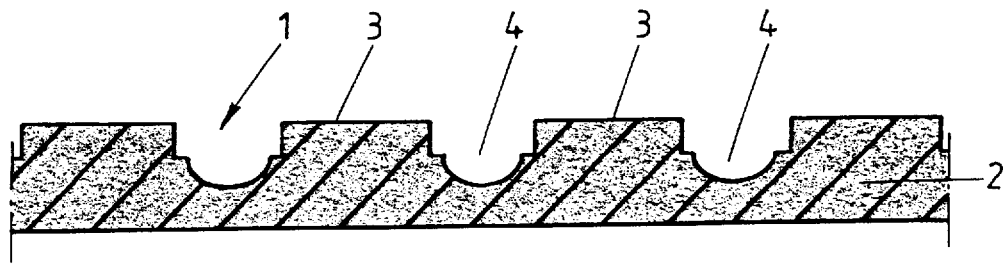
FIG. 1 is a cross-sectional view taken across the line I—I of FIG. 2.
Figure 2:
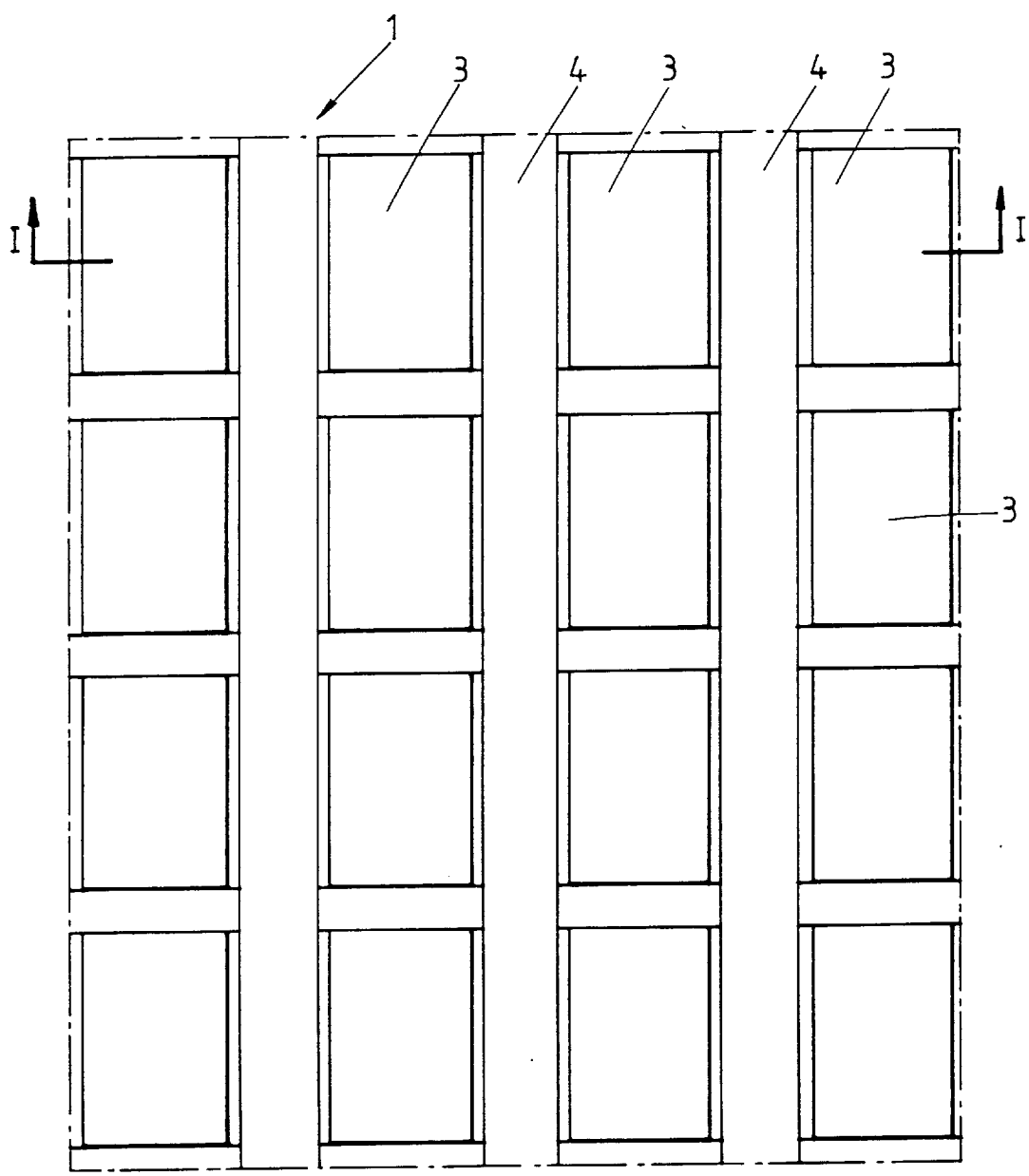
FIG. 2 is a plan view of a lining or part of a lining according to the invention.

As can be seen from these FIGS. 1 and 2, the lining 1 consists in its entirety of an elastic material 2 incorporated in which are ceramic particles whose properties will be described below. These ceramic particles, whose extremely small dimensions are difficult to reproduce, occupy the whole of the elastic material forming the lining.

This lining, in a preferred embodiment, present a plane surface above which protuberances 3 stand out. The shape of these protuberances is completely optional, but excellent results have been obtained by making them rectangular.

Between the protuberances there are channels 4 for the evacuation of water. These channels 4, which extend between the protuberances 3, permit a rapid evacuation of water when the conveyor belt and the drum are working either in water or in conditions which cause the accumulation of water between the belt and the drum.

Other geometrical configurations of these channels are obviously possible.

A description of the composition of the elastic material in which the ceramic particles are distributed is given below.

The increase in the coefficient of friction due to the incorporation of ceramic particles, whose abrasive nature and hardness reach a value of 9 on the Mohs scale, produces no increase in the wear of the conveyor belt with which it is in contact. This result is due to a combination of particles having a high abrasion resistance, embedded in the elastomeric mass, contributing a high coefficient of friction and an elasticity allowing good contact between the conveyor belt and the coating with, as an end result, a higher abrasion resistance and good adhesion between the belt and the coating. It is also due to the geometry of the ceramic particles, whose dimensions are given below as an example.

A first type of ceramic particle comes in the form of grains with rounded edges whose dimensions lie between 500 and 1000$\mu$.

Another type of ceramic particle comes in the form of sharp-edged needles. These particles have dimensions lying between 100 and 500$\mu$ and the diameter-to-length ratio of these needle-shaped particles is 1:5.

The last type comes in the form of a powder in which the dimensions of the particles are much smaller and lie between 10 and 100$\mu$.

The needle-shaped particles which have the largest dimensions are capable of anchoring themselves in the elastic material and do not risk being detached from it, particularly when the conveyor belt passes over the drum.

The needle-shaped ceramic particles with sharp corners form a three-dimensional network in the rubber material; the other ceramic particles, which come in the form of rounded grains or a powder, are distributed randomly in the elastic material. As the boundary of the volume of the network is formed by the needle-shaped particles, the particles in powder form and the rounded particles are trapped inside the network.

The particles of larger size must have a Mohs hardness less than that of the smaller particles because the abrasive character increases with dimensions, which means that, by choosing the appropriate ratio between the various ceramic elements inside the ceramic mass and the appropriate ratio between these ceramic masses, it is possible to influence the value of the coefficient of friction and the degree of wear on the lining.

A final and very important function of the ceramic particles in a lining according to the present application is a reduction in the tendency to exhibit a lower coefficient of friction when working in wet conditions (not when the conveyor belt and/or the drum are damp).

The particles, although embedded in the elastic material, produce a surface porosity which results from their distribution in the mass and from their shape. That is why the coefficient of adhesion of a lining produced according to the standards of the present patent application offers a higher coefficient of friction and ensures a higher efficiency than when linings of the various types known so far are used.

The advantages offered by the lining just described are quite obviously the following:

(a) A reduction in wear because of the homogeneous incorporation of ceramic particles, possibly including an epoxy binder capable of improving the adhesion of these particles to the elastic material. In general, the presence of a binder improves the resistance to wear and increases the Shore hardness of the rubber, depending on the quantity of binder. The epoxy binder surrounds all the ceramic particles and acts as an additional adhesive improving the adhesion, even though the elastic material already fulfills this role.

(b) An increase in the coefficient of friction compared with that of a conventional lining, due to the abrasive nature and the hardness of the ceramic particles incorporated in the elastic material.

What is claimed is:

1. A lining element for use on a drum in contact with a conveyor belt, said lining element comprising a matrix of an elastic material selected from the group consisting of natural rubber, synthetic rubber and polyurethane, and ceramic particles randomly distributed within said matrix, said ceramic particles having dimensions of about 10 to 2000 microns and surrounded by an epoxy binder.

2. A lining element according to claim 1, wherein said ceramic particles are in the form of grains having rounded edges.

3. A lining element according to claim 2, wherein said grains have dimensions between 500 and 1000$\mu$.

4. A lining element according to claim 1, wherein said ceramic particles are in the form of a powder and have dimensions of 10 to 100$\mu$.

5. A lining element according to claim 1, including ceramic particles in the form of sharp-edged needles distributed throughout the matrix.

6. A lining element according to claim 5, wherein said needles have dimensions of 100 to 500$\mu$ and a diameter-to-length ratio of 1:5.

7. A lining element according to claim 1, wherein one surface thereof defines channels between raised portions to drain liquids, said channels defining a circular arc bottom.

* * * * *